April 2, 1963
T. IVALDI
3,083,782
VEHICLE WITH DRIVEN FRONT STEERABLE WHEELS
AND DRIVEN TANDEM REAR WHEELS
Filed Sept. 18, 1961
6 Sheets-Sheet 1
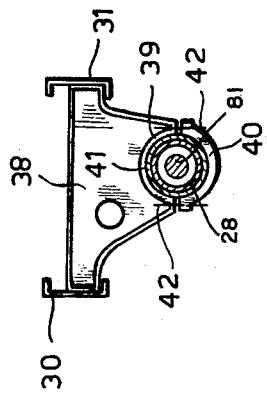
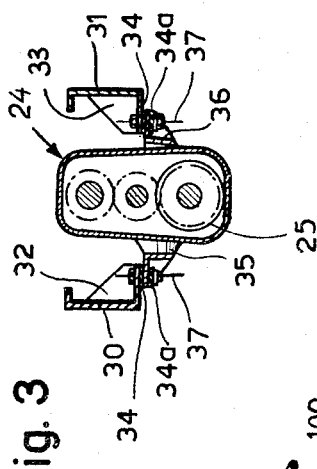
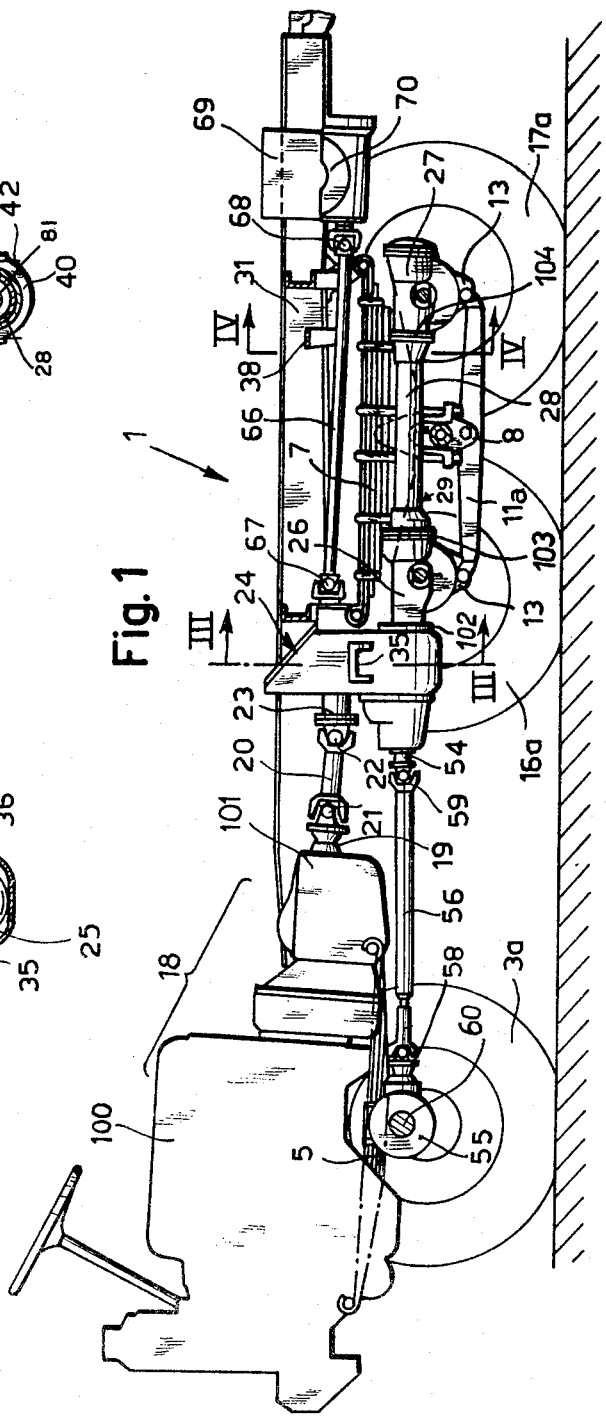

United States Patent Office 3,083,782
Patented Apr. 2, 1963

3,083,782
VEHICLE WITH DRIVEN FRONT STEERABLE WHEELS AND DRIVEN TANDEM REAR WHEELS
Tito Ivaldi, Turin, Italy, assignor to Fiat Societe per Azioni, Turin, Italy
Filed Sept. 18, 1961, Ser. No. 138,695
1 Claim. (Cl. 180—24)

This is a continuation-in-part of my application Serial No. 33,423 filed June 2, 1960, since abandoned.

This invention relates to motor vehicles, more particularly to trucks, having a pair of front steering wheels and a four-wheel rear drive assembly.

The object of this invention is to provide a motor vehicle of this character, embodying a novel and advantageous power transmission between the engine and the said drive assembly in order to obtain a substantial reduction in the steering radius of the vehicle.

A further object of the invention is to provide the vehicle with an increased clearance between the ground and the transmission by reducing the size of the most cumbersome parts of the transmission, such as differentials, and thereby reducing the possibility of damaging the vehicle in cross-country driving conditions.

The above and other objects which will be apparent from the following description, are attained by means of a construction and an arrangement of parts that will now be described in detail and with reference to the embodiment shown in the acompanying drawings in which:

FIGURE 1 is a sectional side view of the vehicle with the body removed,

FIGURE 3 is a cross-sectional view taken on line III—III of FIGURE 1,

FIGURE 4 is a cross-sectional view taken on line IV—IV of FIGURE 1,

Figure 2:
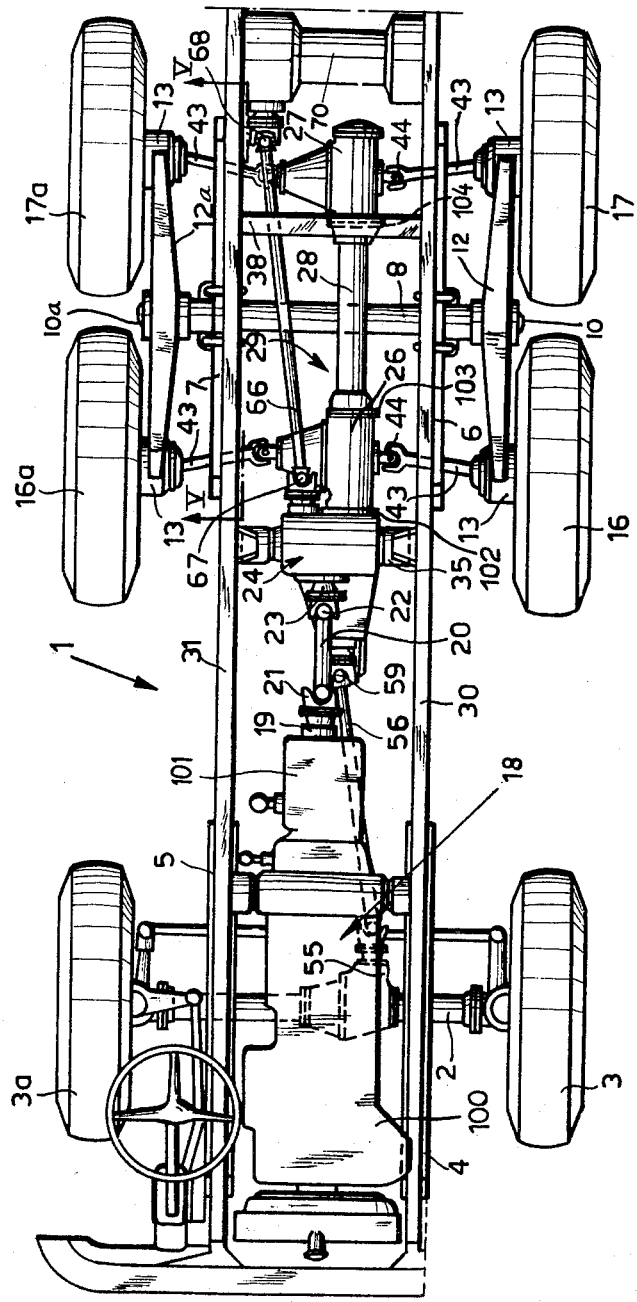
FIGURE 2 is a plan view of the vehicle.
Figure 5:
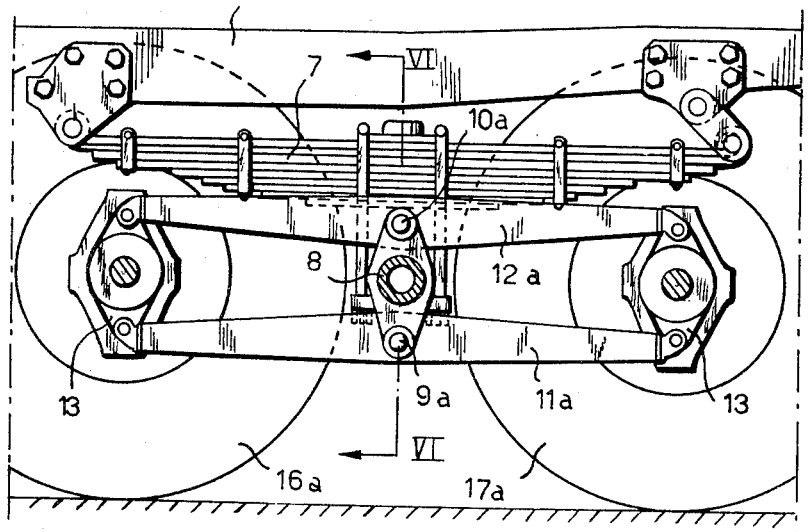
FIGURE 5 is a cross-sectional view taken on line V—V of FIGURE 2.
Figure 6:
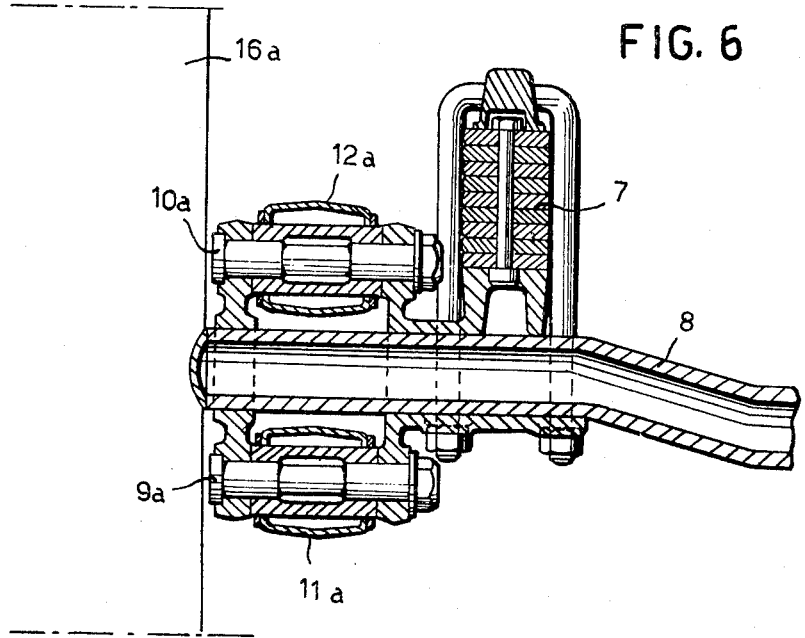
FIGURE 6 is a cross-sectional view on line VI—VI of FIGURE 5.

As shown in the drawings, a vehicle frame 1 is supported by means of two leaf springs 4, 5, on a front axle assembly 2, provided with two steering wheels 3, 3a.

The rear portion of the frame 1 is supported on two longitudinal leaf springs 6, 7, each of the said springs having its ends fastened by the conventional means to a longitudinal member 30, or 31 respectively, of the said frame 1.

The middle portion of each rear spring is connected by means of clamps to a horizontal beam 8, extending transversely beneath the frame 1.

The said beam 8 is provided at either end with a pair of trunnions 9, 10 and 9a, 10a having a lower rocking beam 11 and an upper rocking beam 12, forming a pair, and 11a, 12a respectively, mounted on each trunnion. Each pair of rocking beams carries at either end a sleeve-like housing 13 pivotally mounted thereon as at 87 and, adapted to receive boss 14 of a non-rotative spindle 14a of hub 15 on each of the rear driving wheels 16, 17 and 16a, 17a, so as to form a pair of wheels on each side of the frame. Each pair of wheels is free to rock independently about its trunnions 9, 10, 9a, 10a, respectively and while doing so, to maintain the wheel axes always equidistant and parallel to the said trunnions.

Resiliently supported from the front portion of the frame, by known means, comprising pads of resilient material (not illustrated), is an engine 100 fitted with a clutch and a gear box 101, forming a rigid encased unit 18 having an output shaft 19 operatively connected to a reducing and transfer gear 24 of the kind known in the art and disclosed, for instance, in U.S. Patent 2,574,986, by means of a splined main shaft 20, provided with two universal joints 21, 22.

The said reducing and transfer gear 24 and two tandem mounted differential gears 26 and 27, connected by means of a rigid sheath 28 containing a shaft 81, form an encased rigid rear transmission unit 29. The components 24, 26, 27 and 28 of the said unit 29 are rigidly interconnected by means of bolted flanged joints 102, 103, 104 provided on abutting parts of each component.

The unit 29 is supported from the longitudinal members 30, 31 of the frame 1, by means of a pair of opposing brackets 32, 33 (FIGURE 3) fixed to the said members 30, 31, and abutting through interposed blocks of resilient material 34, 34a, against a corresponding pair of brackets 35, 36 fixed laterally to the casing of the reducing and transfer gear 24, forming the front portion of the unit 29. The said brackets are clamped together by means of bolts 37.

The rear portion of the unit 29 is supported by means of a bracket 38, fixed transversely to both members 30, 31 and provided with a seat 39 and a corresponding yoke 40, to engage through interposed blocks of resilient material 41 the sheath 28, the yoke 40 being secured to the said bracket by means of bolts 42.

Figure 7:
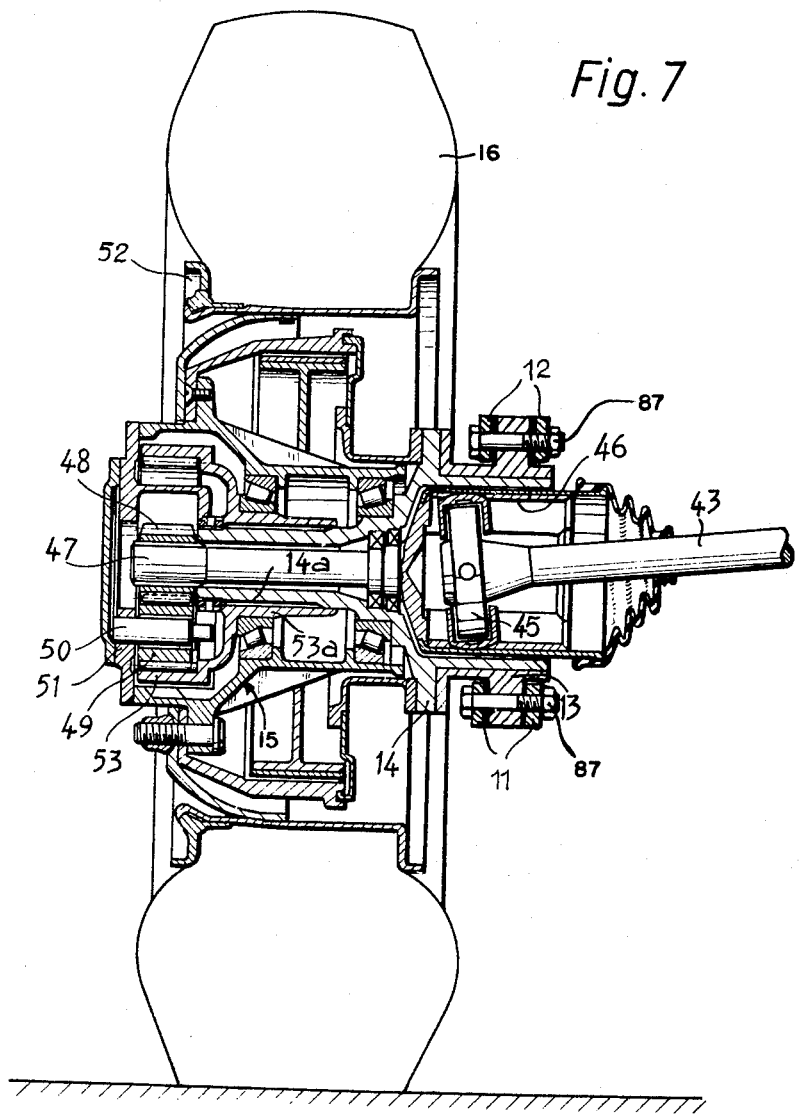
FIGURE 7 is an axial section of a rear wheel hub assembly.
Figure 8:
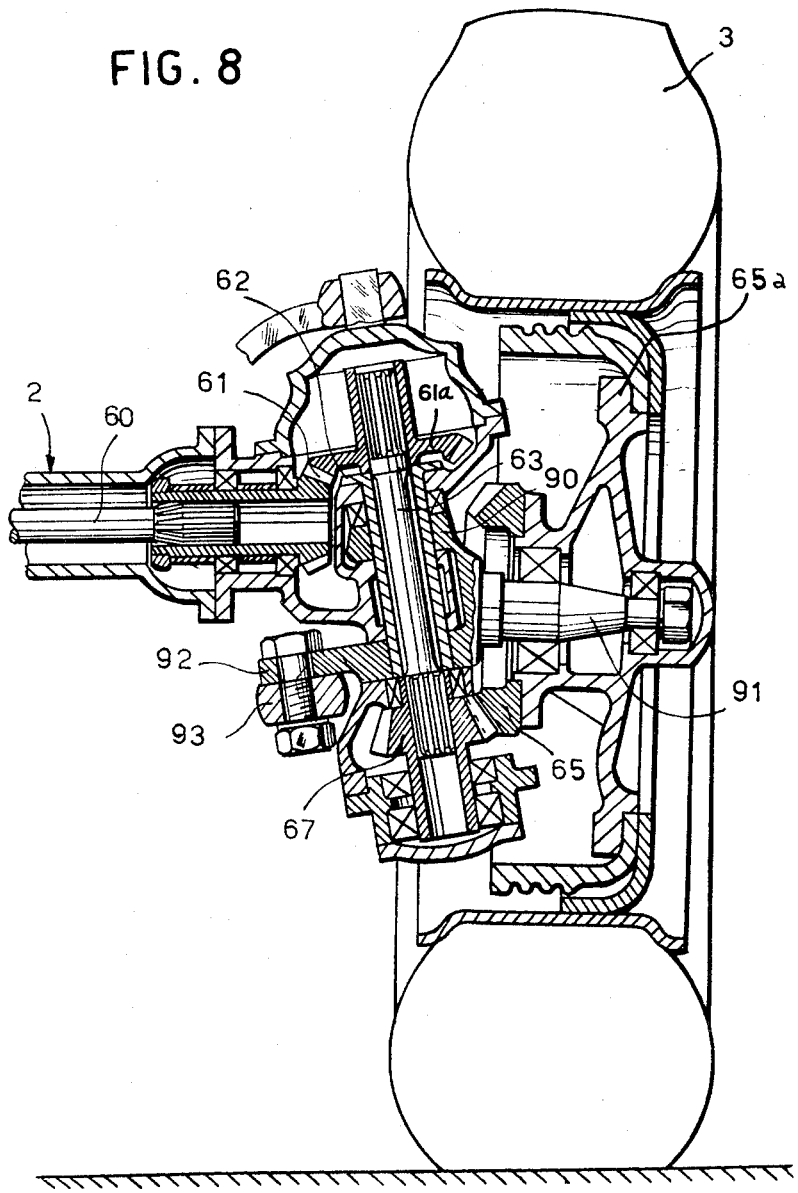
FIGURE 8 is an axial section of a front wheel hub assembly.

The driving torque is transmitted from the rear unit 29 to the rear wheels 16, 16a, 17, 17a by means of four substantially transverse swinging shafts 43, each shaft 43 being connected by a universal joint 44 (FIGURE 2) to an output shaft of the differential gearings 26, 27, and by means of a universal and axially slidable joint 45 to a sleeve 46 (FIGURE 7) of a stub shaft 47 located in the hollow of a wheel spindle 14a.

The stub shaft 47 carries a coaxial sun gear 48, meshing with planet gears 49, supported by pins 50, fixed to the hub portion 51, secured to the wheel rim 52. The planet gears 49 also mesh with a ring gear 53 fixed by means of a sleeve 53a to the spindle 14a.

The differential 55 of the front axle 2 is driven from an output shaft 54 of the reducing and transfer gear 24, by means of a splined shaft 56 provided with two universal joints 58, 59.

Each front wheel 3, 3a, comprises a hub 65a, mounted on a spindle 91 attached to the ends of the front axle by means of a steering knuckle 90, hinged on a hollow, inclined king pin 62. The steering knuckle 90 is provided with a steering arm 92, connected to a steering line 93.

The front wheels are drivingly connected to half shafts 60 of the differential 55 by means of a reducing gear allowing for a large steering angle and comprising a bevel wheel 61, keyed to the outer end of each half shaft 60, and meshing with a bevel gear 61a, keyed on a shaft 63, coaxially and rotatably mounted within the hollow king pin 62. Keyed on the shaft 63 is another bevel gear 67, which meshes with a bevel ring 65, fixed to the wheel hub 65a.

The reducing and transfer gear 24 is connected by means of a shaft 66 provided with universal joints 67, 68, to a power take-off 69 comprising a winch 70 (FIGURE 2) supported from the rear portion of the frame.

In operation, the output shaft 19 of the gearbox 101 drives the input shaft 23 of the reducing and transfer gear 24 through the main shaft 20.

Figure 9:
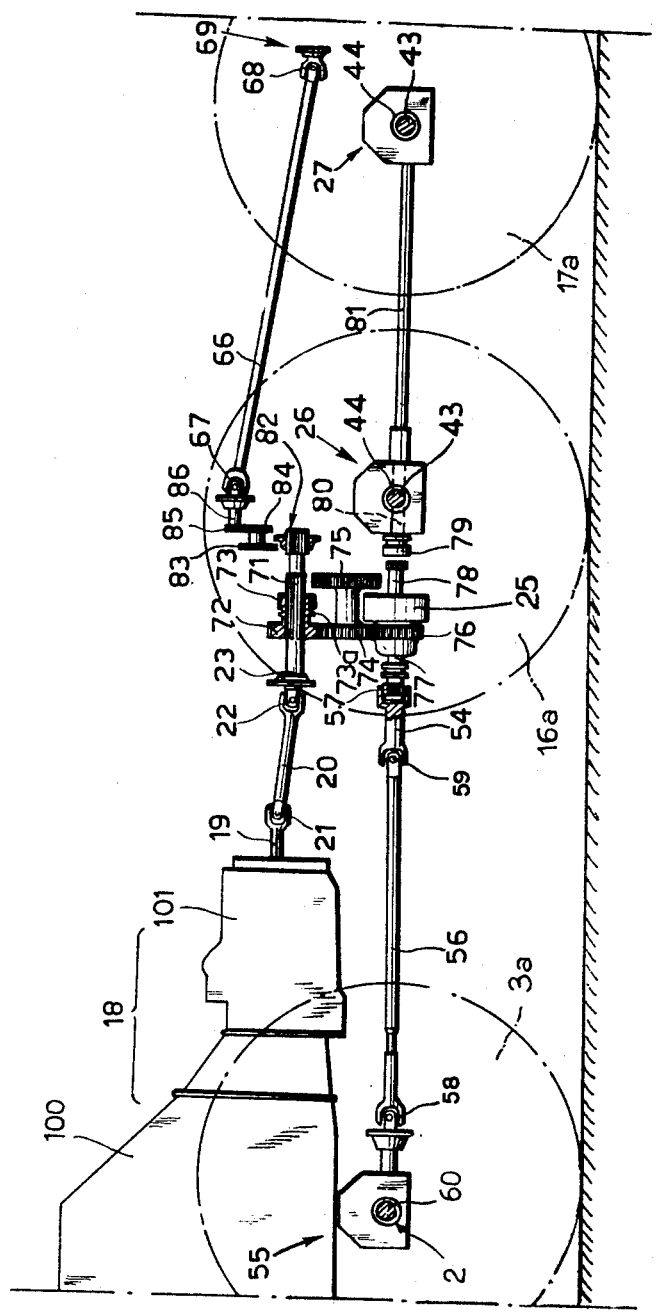
FIGURE 9 is a diagrammatic representation of the power transmission.

The said input shaft 23 carries slidably, by means of its splined section 71 (FIGURE 9), a double spur gear 72, 73 controlled by a conventional shifting fork engaging a collar 73a. The spur gears 72, 73 can be selectively meshed with an intermediate double gear 74, 75, which gear 74 is in constant mesh with the crown wheel 76 of a casing 25 (FIGURE 9) housing a planetary gear of the transfer gear. Thus, by shifting the double gear 72, 73, two speeds of the crown wheel 76 can be obtained to each speed of the input shaft 23 governed by the gearbox 101.

The planetary gear enclosed in said casing 25 is designed to deliver the full torque either to the rear wheels, or to the front wheels, or two thirds of the torque to the rear wheels and one third to the front wheels.

For this purpose, both ends 77, 78 of the transfer gear output shaft are provided with manually operated slidable splined clutches 57 and 79 for selective insertion of the shaft 56 driving the front differential 55, or of the shaft 80 and 81 driving the rear differentials 26 and 27.

The power take-off 69 is driven from the reducing gear shaft 23, by means of a slidably mounted and manually controlled splined pinion 82, which through an intermediate double spur wheel 83, 84 and a spur wheel 85 carried by a shaft 86, drives the power take-off shaft 66.

It will, of course, be understood that various details of construction may be varied through a wide range without departing from the principles of this invention, and it is therefore, not the purpose to limit the invention otherwise than necessitated by the scope of the appended claim.

What I claim is:

In a motor vehicle the combination of a frame, a rigidly interconnected engine unit including a gearbox mounted on a front portion of the frame, a pair of front steering road wheels capable of being driven, a front axle assembly comprising a differential with two half shafts extending laterally therefrom, a steering knuckle with a spindle at each end of said axle assembly a front wheel hub rotatably mounted on each spindle, a bevel reducing gear mounted between each half shaft and the hub of each front wheel and interconnecting each said half shaft and front wheel hub, a four wheel rear driving wheel assembly comprising a rigid transverse beam horizontally extending beneath a rear portion of the frame, a pair of longitudinal leaf springs each having ends attached to the frame and the middle portion fixed to the transverse beam, a pair of vertically spaced and aligned trunnions at each end of said beam, a pair of vertically spaced longitudinally extending rocking beams at each end of said transverse beam, each of said rocking beams having its ends free and its middle portion pivotally mounted on a respective trunnion, a non-rotative tubular spindle between the corresponding free ends of each pair of vertically spaced rocking beams, means pivotally connecting each said tubular spindle and respective ends of each pair of rocking beams, a stub shaft coaxially and rotatably mounted in each said tubular spindle, a rear wheel hub rotatably mounted on each said tubular spindle, an epicyclic reducing gear mounted between the wheel hub and the stub shaft of each rear wheel, a rigid encased rear transmission unit including rigid bracket means fixedly securing said transmission unit to said rear portion of the frame independently of the transverse beam, a reducing and transfer gear and said rear transmission unit including a pair of longitudinally spaced operatively interconnected differentials rigidly connected together, a swinging shaft connecting each of said stub shafts with its respective differential in an axially slidable and rotatable driving engagement, a main shaft operatively connecting the gearbox with the reducing and transfer gear, and a shaft operatively connecting the reducing and transfer gear with the front axle differential.

References Cited in the file of this patent
UNITED STATES PATENTS

| | | |
|---|---|---|
| 1,947,337 | Fageol | Feb. 13, 1934 |
| 2,395,333 | Lee | Feb. 19, 1946 |
| 2,574,986 | Schou | Nov. 13, 1951 |
| 2,659,246 | Norelius | Nov. 17, 1953 |
| 2,699,222 | Van Doorne | Jan. 11, 1955 |
| 2,857,975 | Thorne | Oct. 28, 1958 |
| 2,941,423 | Armington et al. | June 21, 1960 |

FOREIGN PATENTS

| | | |
|---|---|---|
| 500,992 | Italy | Nov. 22, 1954 |
| 743,027 | Great Britain | Jan. 4, 1956 |